United States Patent Office 3,545,955
Patented Dec. 8, 1970

3,545,955
PLANT GROWTH INHIBITION WITH 4-HYDROXY-TETRAFLUOROPYRIDINE AND DERIVATIVES THEREOF
Edwin Francis George, Bracknell, England, assignor to Imperial Chemical Industries Limited, London, England, a corporation of Great Britain
No Drawing. Filed July 17, 1968, Ser. No. 745,362
Claims priority, application Great Britain, July 24, 1967, 33,974/67
Int. Cl. A01n 5/00, 9/22
U.S. Cl. 71—76    7 Claims

ABSTRACT OF THE DISCLOSURE

A process for stunting the growth of monocotyledons which comprises applying to the monocotyledons an inhibitor which is 4-hydroxytetrafluoropyridine, or a salt, ether or ester thereof, in amount sufficient to inhibit the growth of but insufficient to kill the monocotyledons.

---

This invention relates to growth inhibition.

Where grass is not grown for fodder or grazing, much unproductive time may be spent in cutting it. Every lawn-owner appreciates this. Frequent mowing is also necessary in, for example, public parks, recreation grounds, playing fields and along road verges. It will be seen that a process for inhibiting the growth of grass, so as to reduce or even eliminate the need for such mowings, would be of considerable practical value.

According to the present invention we provide a process for stunting the growth of monocotyledons which comprises applying to monocotyledons 4-hydroxytetrafluoropyridine, or a salt, ether or ester thereof, in amount sufficient to inhibit the growth of but insufficient to kill the monocotyledons.

Besides the inhibition of ornamental grasses, it is a particular feature of the invention to use 4-hydroxytetrafluoropyridine or a salt or ester thereof to stunt the growth of sugar cane since thereby sugar storage in the cane is increased and a larger quantity of sugar is recovered from the crop. According to this invention sugar cane plants are preferably treated after emergence and before harvesting.

Another feature of the invention is the use of 4-hydroxytetrafluoropyridine and salts, ethers and esters thereof to stunt the growth of cereal plants, particularly wheat. Modification of growth in this way is useful in that shorter plants are better able to resist lodging.

The manufacture and properties of 4-hydroxytetrafluoropyridine have been described by Chambers, Hargreaves and Musgrave, Journal of the Chemical Society, 1964, at page 5,634. It is phytotoxic both to monocotyledons and di-cotyledons and if applied in sufficient quantity it will kill monocotyledons. Preferred rates of application when carrying out the present invention are in the range 0.5 to 10 lbs. per acre, depending on the tolerance to 4-hydroxytetrafluoropyridine of the monocotyledons to be treated; in certain circumstances however lesser or greater quantities may be used.

When a salt, ether or ester of 4-hydroxytetrafluoropyridine is to be used, the rate of application will depend upon the particular compound selected; in general, however, preferred rates of application are in the range 0.5 lb. to 20 lbs. per acre.

4-hydroxytetrafluoropyridine and salts, ethers and esters thereof are preferably applied to monocotyledonous plants in the form of compositions containing the active ingredient in admixture with a carrier comprising a solid diluent, or a liquid diluent containing a surface-active agent. The compositions may be applied to monocotyledonous plants either before or after their emergence from the soil. The compositions may be in the form of a powder in which a minor proportion of the active ingredient is in admixture with a major proportion of a solid diluent. Suitable solid diluents include powdered kaolin, fuller's earth, gypsum, chalk, Hewitt's earth, and china clay. In general, liquid compositions are preferred, because they can be applied more conveniently.

Liquid compositions usually comprise an aqueous solution or dispersion of the active ingredient in water containing a surface-active agent. In dispersions, the active ingredient can be present in the composition as solid particles or as droplets of a solution of the active ingredient in a water-insoluble solvent. Surface-active agents which may be used include condensation products of ethylene oxide with various substances, for example with alkylated phenols, such as octylphenol and nonylphenol; sorbitan monolaurate, oleyl alcohol, cetyl alcohol, and propylene oxide polymer. Other agents include calcium dodecylbenzenesulphonate, calcium lignosulphonate, and sodium lignosulphonate. One method of making a liquid composition comprises dissolving the active ingredient in an organic solvent and then agitating the solution with water containing a surface-active agent. A preferred method comprises first dissolving both the active ingredient and a surface-active agent in a solvent and then agitating the solution with water.

The amounts of the active ingredient which may be used in the composition can vary widely depending upon the ingredient which is to be used and the plant to which the composition is to be applied. In general, however, compositions containing from 0.1% to 2.0% by weight are preferred although larger or smaller amounts may sometimes be desirable.

The compositions are conveniently supplied to a user in the form of a concentrate, which is a composition containing a high proportion of the active ingredient, and which therefore is generally required to be diluted, usually with water, before application. The concentrates can contain from 10% to 80% of the active ingredient, although from 20% to 70% is preferred.

An especially satisfactory form of concentrate comprises the active ingredient dispersed in a finely divided state in water in the presence of a surface-active agent and a suspending agent. Suspending agents which are preferred are those which impart thixotropic properties to, and increase the viscosity of the concentrate, for example hydrated colloidal mineral silicates, montmorillonite, beidellite, nontronite, hectorite, saucorite, cellulose derivatives, and polyvinyl alcohol. Bentonite is particularly preferred as a suspending agent.

Another form of concentrate comprises a "wettable" powder, that is to say, a mixture of an active ingredient which has been finely divided and mixed with a solid surface-active agent either with or without an additional solid diluent. When agitated with water, the surface-active agent dissolves and promotes the dispersion of the active ingredient.

4-hydroxytetrafluoropyridine itself is freely soluble in water and it is therefore generally preferred to apply it as a solution in water containing a surface-active agent. It may also be applied in the solid state, preferably mixed with a solid diluent, for example bentonite or china clay. Water-soluble salts of 4-hydroxytetrafluoropyridine may conveniently be used in the form of aqueous solutions which may contain surface-active agents.

Salts of 4-hydroxytetrafluoropyridine useful in the process of the invention include salts of alkali metals, alkaline earth metals, transition metals, and salts of the ammonium and substituted ammonium ions. Preferred salts include sodium and potassium salts.

Preferred ethers include alkyl ethers, particularly the $C_1$ to $C_4$ alkyl ethers.

Preferred esters of 4-hydroxytetrafluoropyridine include esters derived from carboxylic acids and sulphonic acids. Examples of particular compounds which may be used include the following:

4-acetoxytetrafluoropyridine
4-benzoyloxytetrafluoropyridine
4-methanesulphonyloxytetrafluoropyridine
4-hexanesulphonyloxytetrafluoropyridine
4-benzenesulphonyloxytetrafluoropyridine
4-p-methoxybenzenesulphonyloxytetrafluoropyridine
4-o-nitrobenzenesulphonyloxytetrafluoropyridine
4-p-chlorobenzenesulphonyloxytetrafluoropyridine
4-pentafluorobenzenesulphonyloxytetrafluoropyridine The following examples illustrate the invention.

EXAMPLE 1

Small plants of wheat and barley (typical readily cultured monocotyledonous plants) were sprayed with 4-hydroxytetrafluoropyridine at a rate equivalent to 5 lbs. of active ingredient per acre. After two weeks the growth of the plants was assessed in comparison with untreated controls. Wheat was found to be reduced in size by about 75% in comparison with the controls. There had been no internode growth since application of the spray, and little leaf growth. Existing leaves were a darker green than normal and showed only slight symptoms of scorch, although the base of the first leaf had collapsed.

EXAMPLE 2

Small sugar cane plants growing in 4-inch pots of John Innes compost were sprayed with 4-hydroxytetrafluoropyridine at three rates. Samples of the chemical were prepared by grinding with 1 mm. glass beads in a vibration mill for 15 minutes in the presence of 20% "Dispersol" T ("Dispersol" is a registered trademark). Plants were sprayed at 100 gallons/acre with 0.05% "Lissapol" NX ("Lissapol" is a registered trademark) in the final solution. Stem and leaf lengths of experimental plants measured 19 days after treatment are presented in Table 1. Leaf damage was slight, particularly at lower rates.

TABLE 1
[Treatments: 4-plant means; Control: 12-plant means]

| Rate of treatment | Mean length of stem to last ligule | | Length of first unfurled leaf of spindle | | Length of second unfurled leaf of spindle | |
|---|---|---|---|---|---|---|
| | Cm. | Percent control | Cm. | Percent control | Cm. | Percent control |
| 10 lb./acre | 21.1 | 65.1 | 58.5 | 67.3 | 64.0 | 62.3 |
| 5 lb./acre | 21.4 | 65.9 | 63.5 | 73.1 | 68.8 | 66.9 |
| 2 lb./acre | 27.8 | 85.5 | 61.0 | 70.2 | 75.0 | 73.0 |
| Control | 32.4 | 100 | 86.9 | 100 | 102.8 | 100 |

EXAMPLE 3

This example illustrates the application of the process of the invention to wheat and barley plants. Young wheat and barley plants were sprayed with compositions comprising dilute aqueous dispersions or solutions of the compounds of Table 2 below. The compositions contained 0.05% of a wetting agent comprising a condensate of p-nonylphenol with from seven to eight molecular proportions of ethylene oxide. The spray volume was equivalent to 100 gallons per acre. The percentage reduction in size of treated plants as compared with untreated control plants was assessed after 14 days. Results are given in Table 2. The symbol R used in the formulae of Table 2 below represents the group

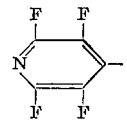

TABLE 2

| Test compound | | | Reduction in plant size percent | |
|---|---|---|---|---|
| Compound No. | Structure | Application rate, lb./acre | Wheat | Barley |
| 1 | ROH | 5 | 75 | 40 |
| 1 | ROH | 2 | 40 | 10 |
| 2 | ROCH₃ | 5 | 15 | 0 |
| 3 | ROCOCH₃ | 5 | 65 | 10 |
| 3 | ROCOCH₃ | 1 | 10 | 10 |
| 4 | ROCOC₆H₅ | 5 | 55 | 20 |
| 4 | ROCOC₆H₅ | 1 | 10 | 10 |
| 5 | ROSO₂CH₃ | 5 | 60 | 15 |
| 5 | ROSO₂CH₃ | 1 | 15 | 0 |
| 6 | ROSO₂C₆H₅ | 5 | 65 | 15 |
| 6 | ROSO₂C₆H₅ | 1 | 10 | 0 |
| 7 | ROSO₂·C₆H₄·Clp | 5 | 40 | 25 |
| 7 | ROSO₂·C₆H₄·Clp | 1 | 15 | 0 |
| 8 | ROSO₂·C₆H₄·OCH₃p | 5 | 40 | 30 |
| 8 | ROSO₂·C₆H₄·OCH₃p | 1 | 20 | 0 |

EXAMPLE 4

This example illustrates the application of the process of the invention to sugar cane plants. Sugar cane plants 15 cm. in height were sprayed with aqueous solutions or dispersions of the compounds of Table 3, in a spray volume corresponding to 100 gallons per acre. The spray compositions contained 0.05% of a wetting agent comprising a condensate of p-nonylphenol with from seven to eight molecular proportions of ethylene oxide. Following the application of the compounds to the test plants, the height of the plants was measured at intervals of time and the increase in height recorded. Three plants were used in each treatment and six plants in the untreated controls. The value given in Table 3 for the increase in height is the average value for the three or six plants. In Table 3, the symbol R in the formulae represents the group

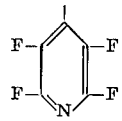

The results are set out in Table 3.

| Test compound | | | Increase in plant height (mm.) after a period of | | | |
|---|---|---|---|---|---|---|
| Compound No. | Structure | Rate of application, lb./acre | 13 days | 22 days | 30 days | 42 days |
| | | ¹ 0 | 86.0 | 142.0 | 173.5 | 221.0 |
| 1 | ROH | 1 | 51.7 | 92.7 | 121.6 | 195.0 |
| 1 | ROH | 2 | 34.0 | 57.7 | 82.6 | 131.7 |
| 1 | ROH | 5 | 24.3 | 21.7 | 20.6 | 21.7 |
| 2 | ROSO₂C₆H₅ | 5 | 31.7 | 51.3 | 59.3 | 86.0 |
| 3 | ROCOC₆H₅ | 5 | 66.0 | 99.3 | 128.0 | 167.7 |

¹ Control.

EXAMPLE 5

This example illustrates the reduction in growth brought about in cocksfoot plants and Italian rye-grass plants when treated in accordance with the process of the invention.

Four individual cocksfoot plants (*Dactylis glomerata*) were planted in a four-inch flowerpot. When the plants were established, the foliage was cut off to a level of two inches above the soil. Fifteen days later, the foliage was again cut back to the same height. After two further days, the plants were sprayed with 4-hydroxytetrafluoropyridine as an aqueous solution containing 0.05% of a wetting agent comprising a condensate of p-nonylphenol with from seven to eight molecular proportions of ethylene oxide. Four pots of plants were used in each spray treatment, and four were left untreated as controls. A similar experiment was conducted with plants of Italian rye grass, except that only two pots of plants were used in each spray treatment, while four pots were left untreated as controls.

After the spray treatment, the plants were allowed to grow for a period, and then the above ground portions were harvested and weighed. The results are given in Table 4 below:

TABLE 4

| Plant species | Amount of 4-hydroxy-tetrafluoro-pyridine applied, lb./acre | Total fresh weight of cut foliage (gm.) | Mean fresh weight (gm.) of foliage per plant |
|---|---|---|---|
| Cocksfoot | 5 | 84.64 | 21.16 |
| Do | 2 | 84.13 | 21.03 |
| Do | ¹0 | 105.36 | 26.34 |
| Italian rye-grass | 5 | 87.60 | 43.8 |
| Do | 2 | 93.49 | 46.75 |
| Do | ¹0 | 220.19 | 55.05 |

¹ Control.

It is apparent from the above figures that the higher rate of application of 4-hydroxytetrafluoropyridine caused a reduction of approximately 20% in the fresh weight of both grasses.

EXAMPLE 6

4-hydroxytetrafluoropyridine was applied to sugar cane three weeks before harvest, by spraying it as an aqueous solution containing 0.1% w./v. of a surface-active agent comprising a condensate of p-nonylphenol with from seven to eight molar proportions of ethylene oxide. Spray rates of from 2.5 to 5 pounds per acre produced a marked increase in the sugar content of the cane at harvest as compared with untreated controls.

What is claimed is:
1. A process for stunting the growth of monocotyledonous crop plants, which comprises applying to the plants an inhibitor selected from the group consisting of 4-hydroxytetrafluoropyridine, alkali metal, alkaline earth metal, transition metal, ammonium and substituted ammonium salts of 4-hydroxytetrafluoropyridine, alkyl ethers of 4-hydroxytetrafluoropyridine, wherein the alkyl contains from 1 to 4 carbon atoms, esters of 4-hydroxytetrafluoropyridine derived from alkanoic and alkanesulphonic acids of 1 to 6 carbon atoms, and esters of 4-hydroxytetrafluoropyridine derived from benzoic and benzenesulphonic acids optionally substituted by at least one substituent selected from the group consisting of nitro, methoxy, fluorine, and chlorine radicals, said inhibitor being applied in an amount sufficient to inhibit the growth of, but insufficient to kill the plants.

2. A process according to claim 1 in which the monocotyledons are grasses.

3. A process according to claim 1 in which the monocotyledons are sugar cane plants.

4. A process according to claim 1 in which the monocotyledons are cereal plants.

5. A process according to claim 1 wherein the inhibitor is applied at a rate of from 0.5 to 20 lbs. per acre.

6. A process according to claim 1 wherein the inhibitor is a sodium or potassium salt of 4-hydroxytetrafluoropyridine.

7. A processing according to claim 1 wherein the inhibitor is a carboxylic or sulphonic acid ester of 4-hydroxytetrafluoropyridine.

References Cited

UNITED STATES PATENTS

| 3,234,228 | 2/1966 | Johnston et al. | 71—94 |
| 3,249,419 | 5/1966 | Martin | 71—94 |
| 3,256,290 | 6/1966 | Johnston et al. | 71—94 |
| 3,317,542 | 5/1967 | Haszeldine et al. | 71—94 |
| 3,409,624 | 11/1968 | De Selms | 71—94 |

OTHER REFERENCES

Vaculik et al.: "The Effect of Several Cmpds, etc." (1966), CA 65, p. 4564 (1966).

Dow: "Pohyhalo-A-Pyridinol Plant Growth Regs." (1965), CA 63, pp. 2329–30 (1965).

Chambers: "1079, Polyfluoro Hetero Cmpds, etc."

Dow: "Herbicidal polyhalopyridines" (Neth. Appl. 6,402,443) (1965), CA 64, p. 8152 (1966).

LEWIS GOTTS, Primary Examiner

G. HOLLRAH, Assistant Examiner

U.S. Cl. X.R.

71—94; 260—294.8, 295, 296, 297